US006690654B2

(12) United States Patent
Elliott et al.

(10) Patent No.: US 6,690,654 B2
(45) Date of Patent: *Feb. 10, 2004

(54) METHOD AND SYSTEM FOR MULTI-MEDIA COLLABORATION BETWEEN REMOTE PARTIES

(75) Inventors: Isaac Elliott, Colorado Springs, CO (US); Rick Steele, Colorado Springs, CO (US); Jim Verlare, Woodland Park, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,462

(22) Filed: Oct. 1, 1998

(65) Prior Publication Data

US 2002/0136167 A1 Sep. 26, 2002

(Under 37 CFR 1.47)

Related U.S. Application Data

(63) Continuation-in-part of application No. 08/752,271, filed on Nov. 18, 1996, now Pat. No. 5,867,494.

(51) Int. Cl.[7] .............................................. H04L 12/16
(52) U.S. Cl. ........................................ 370/260; 370/352
(58) Field of Search ................................ 370/395, 384, 370/465, 401, 402, 351, 352, 266, 451, 461, 462, 395.1, 353, 354, 355, 356, 400, 410, 431, 468; 379/202, 201, 209, 211, 212, 214, 215, 88.17, 93.01, 93.09; 709/219, 217, 218, 203, 227, 228, 229, 202, 704, 206, 249, 245; 707/10, 14, 704

(56) References Cited

U.S. PATENT DOCUMENTS

| 4,054,756 A | 10/1977 | Comella |
| 4,100,377 A | 7/1978 | Flanagan |
| 4,464,543 A | 8/1984 | Kline et al. |
| 4,653,045 A | 3/1987 | Stanley |
| 4,771,425 A | 9/1988 | Baran et al. |
| 4,897,866 A | 1/1990 | Majmudar et al. |
| 4,907,274 A | 3/1990 | Nomura |
| 4,969,184 A | 11/1990 | Gordon et al. |
| 4,979,206 A | 12/1990 | Dadden |
| 4,996,707 A | 2/1991 | O'Malley |
| 5,029,196 A | 7/1991 | Morganstein |
| 5,068,888 A | 11/1991 | Scherk |
| 5,115,495 A | 5/1992 | Tsuchiya et al. ............ 709/239 |
| 5,146,488 A | 9/1992 | Okada |

(List continued on next page.)

FOREIGN PATENT DOCUMENTS

| EP | 0583135 A | 2/1994 |
| EP | 0740480 A | 10/1996 |
| EP | 0767568 A | 4/1997 |

(List continued on next page.)

OTHER PUBLICATIONS

DataBeam—Net.120 Conference Server 2.0.
DataBeam Meetings Tools.

(List continued on next page.)

Primary Examiner—Dang Ton

(57) ABSTRACT

A method of communicating with a plurality of remote parties allows for multi-media collaboration. A first party, which may be a call center, receives requests for access from first and second remote parties. Each of these remote parties is provided a computer program and a session is initiated for each party. The first party can then independently communicate with the first and second remote parties via the computer program.

24 Claims, 2 Drawing Sheets

U.S. PATENT DOCUMENTS

| | | |
|---|---|---|
| 5,155,761 A | 10/1992 | Hammond |
| 5,159,624 A | 10/1992 | Makita |
| 5,193,110 A | 3/1993 | Jones |
| 5,197,127 A | 3/1993 | Waclawsky et al. |
| 5,204,894 A | 4/1993 | Dadden |
| 5,247,571 A | 9/1993 | Kay |
| 5,268,957 A | 12/1993 | Albrecht |
| 5,287,199 A | 2/1994 | Zoccolillo |
| 5,311,583 A | 5/1994 | Friedes |
| 5,396,542 A | 3/1995 | Alger |
| 5,402,478 A | 3/1995 | Hluchyj et al. ............. 379/221 |
| 5,406,557 A | 4/1995 | Baudion |
| 5,425,091 A | 6/1995 | Josephs |
| 5,428,608 A | 6/1995 | Freeman |
| 5,436,957 A | 7/1995 | McConnell |
| 5,440,620 A | 8/1995 | Slusky |
| 5,448,633 A | 9/1995 | Jamaleddin |
| 5,450,411 A | 9/1995 | Heil |
| 5,452,289 A | 9/1995 | Sharma |
| 5,459,775 A | 10/1995 | Isono |
| 5,463,677 A | 10/1995 | Bash |
| 5,473,608 A | 12/1995 | Gagne |
| 5,477,531 A | 12/1995 | McKee et al. |
| 5,479,473 A | 12/1995 | Zey |
| 5,481,600 A | 1/1996 | Alesio |
| 5,483,586 A | 1/1996 | Sussman |
| 5,483,587 A | 1/1996 | Hogan |
| 5,495,521 A | 2/1996 | Rangachar |
| 5,497,411 A | 3/1996 | Pellerin |
| 5,511,111 A | 4/1996 | Serbetcioglu |
| 5,511,114 A | 4/1996 | Stimson et al. |
| 5,521,719 A | 5/1996 | Yamada |
| 5,521,924 A | 5/1996 | Kakuma et al. |
| 5,524,137 A | 6/1996 | Rhee |
| 5,526,353 A | 6/1996 | Henley et al. |
| 5,526,416 A | 6/1996 | Dezonno et al. |
| 5,539,736 A | 7/1996 | Johnson et al. |
| 5,539,884 A | 7/1996 | Robrock, II |
| 5,541,917 A | 7/1996 | Farris |
| 5,541,927 A | 7/1996 | Kristol |
| 5,541,930 A | 7/1996 | Klingman |
| 5,551,025 A | 8/1996 | O'Reilly |
| 5,559,721 A | 9/1996 | Ishii |
| 5,561,670 A | 10/1996 | Hoffert |
| 5,563,882 A | 10/1996 | Brund et al. |
| 5,579,472 A | 11/1996 | Keyworth, II |
| 5,590,127 A | 12/1996 | Bales |
| 5,590,181 A | 12/1996 | Hogan et al. |
| 5,604,682 A | 2/1997 | McLaughlin |
| 5,604,737 A | 2/1997 | Iwami et al. |
| 5,608,786 A | 3/1997 | Gordon |
| 5,610,910 A | 3/1997 | Focsaneanu et al. |
| 5,617,422 A | 4/1997 | Litzenberger et al. |
| 5,619,555 A | 4/1997 | Fenton |
| 5,623,601 A | 4/1997 | Vu |
| 5,625,404 A | 4/1997 | Grady |
| 5,625,407 A | 4/1997 | Biggs |
| 5,625,677 A | 4/1997 | Feiertag |
| 5,625,682 A | 4/1997 | Gray |
| 5,627,886 A | 5/1997 | Bowman |
| 5,633,916 A | 5/1997 | Goldhagen |
| 5,636,216 A | 6/1997 | Fox et al. |
| 5,644,619 A | 7/1997 | Farris et al. |
| 5,646,982 A | 7/1997 | Hogan et al. |
| 5,651,006 A | 7/1997 | Fujino |
| 5,652,787 A | 7/1997 | O'Kelly |
| 5,654,258 A | 8/1997 | Park |
| 5,654,957 A | 8/1997 | Koyama |
| 5,657,250 A | 8/1997 | Park |
| 5,659,692 A | 8/1997 | Poggio et al. |
| 5,661,790 A | 8/1997 | Hsu |
| 5,661,791 A | 8/1997 | Parker |
| 5,668,857 A | 9/1997 | McHale |
| 5,673,263 A | 9/1997 | Basso et al. |
| 5,675,507 A | 10/1997 | Bobo, II |
| 5,675,741 A | 10/1997 | Aggarwai |
| 5,680,392 A | 10/1997 | Semaan |
| 5,689,550 A | 11/1997 | Garson et al. |
| 5,689,553 A | 11/1997 | Ahuja |
| 5,692,039 A | 11/1997 | Brankley |
| 5,692,126 A | 11/1997 | Templeton et al. |
| 5,695,507 A | 12/1997 | Auth et al. |
| 5,699,089 A | 12/1997 | Murray |
| 5,699,352 A | 12/1997 | Kriete |
| 5,701,295 A | 12/1997 | Bales |
| 5,703,935 A | 12/1997 | Raissyan |
| 5,703,942 A | 12/1997 | Pinard |
| 5,710,884 A | 1/1998 | Dedrick |
| 5,712,903 A | 1/1998 | Bartholomew |
| 5,712,906 A | 1/1998 | Grady |
| 5,712,907 A | 1/1998 | Wegner et al. |
| 5,724,355 A | 3/1998 | Bruno et al. |
| 5,724,412 A | 3/1998 | Srinivasan |
| 5,726,984 A | 3/1998 | Kubler |
| 5,727,129 A | 3/1998 | Barrett |
| 5,729,544 A | 3/1998 | Lev |
| 5,729,599 A | 3/1998 | Plomondon |
| 5,732,078 A | 3/1998 | Arango |
| 5,737,333 A | 4/1998 | Civanlar et al. |
| 5,737,395 A | 4/1998 | Irribarren |
| 5,737,701 A | 4/1998 | Rosenthal |
| 5,740,229 A | 4/1998 | Hanson et al. |
| 5,740,230 A | 4/1998 | Vaudren |
| 5,740,231 A | 4/1998 | Cohn |
| 5,742,668 A | 4/1998 | Pepe |
| 5,742,670 A | 4/1998 | Bennet |
| 5,742,674 A | 4/1998 | Jain |
| 5,742,762 A | 4/1998 | Scholl et al. |
| 5,742,905 A | 4/1998 | Pepe et al. |
| 5,745,556 A | 4/1998 | Ronen |
| 5,745,702 A | 4/1998 | Morozumi |
| 5,749,075 A | 5/1998 | Toader |
| 5,751,338 A | 5/1998 | Ludwig |
| 5,751,706 A | 5/1998 | Land et al. |
| 5,751,791 A | 5/1998 | Chen et al. |
| 5,764,736 A | 6/1998 | Shachar et al. |
| 5,764,745 A | 6/1998 | Chan |
| 5,764,756 A | 6/1998 | Onweller |
| 5,764,916 A | 6/1998 | Busey et al. |
| 5,768,513 A | 6/1998 | Kuthyar et al. |
| 5,768,527 A | 6/1998 | Zhuet |
| 5,781,620 A | 7/1998 | Montgomery |
| 5,782,642 A | 7/1998 | Goren |
| 5,784,443 A | 7/1998 | Chapman |
| 5,784,561 A | 7/1998 | Bruno |
| 5,787,150 A | 7/1998 | Reiman |
| 5,790,174 A | 8/1998 | Richard, III |
| 5,790,548 A | 8/1998 | Sistanizadeh |
| 5,790,645 A | 8/1998 | Fawcett et al. |
| 5,793,498 A | 8/1998 | Scholl |
| 5,799,016 A | 8/1998 | Onweller |
| 5,799,307 A | 8/1998 | Buitron |
| 5,802,283 A | 9/1998 | Grady |
| 5,802,510 A | 9/1998 | Jones |
| 5,802,518 A | 9/1998 | Karaev |
| 5,805,587 A * | 9/1998 | Norris et al. ................ 370/352 |
| 5,809,415 A | 9/1998 | Rossman |
| 5,812,278 A | 9/1998 | Toyoda |
| 5,812,654 A | 9/1998 | Anderson |
| 5,813,006 A | 9/1998 | Polnerow |
| 5,818,836 A | 10/1998 | Duval |

| | | | |
|---|---|---|---|
| 5,828,370 A | 10/1998 | Moeller | |
| 5,828,837 A | 10/1998 | Eikeland | |
| 5,835,579 A | 11/1998 | Gersi | |
| 5,835,720 A | 11/1998 | Nelson | |
| 5,838,682 A | 11/1998 | Dekelbaum | |
| 5,838,683 A | 11/1998 | Corley | |
| 5,839,063 A | 11/1998 | Lee | |
| 5,844,600 A | 12/1998 | Kerr | |
| 5,844,972 A | 12/1998 | Jagadish | |
| 5,848,143 A | 12/1998 | Andrews | |
| 5,848,415 A | 12/1998 | Guck | |
| 5,850,433 A | 12/1998 | Rondeau | |
| 5,850,442 A | 12/1998 | Muffic | |
| 5,854,893 A | 12/1998 | Ludwig | |
| 5,856,974 A | 1/1999 | Gervais | |
| 5,859,967 A | 1/1999 | Kaudeld et al. | |
| 5,862,203 A | 1/1999 | Wulkan et al. | |
| 5,862,223 A | 1/1999 | Walker | |
| 5,862,325 A | 1/1999 | Reed | |
| 5,864,609 A | 1/1999 | Cross | |
| 5,867,494 A * | 2/1999 | Krishnaswamy et al. | 30/352 |
| 5,867,562 A | 2/1999 | Scherer | |
| 5,867,571 A | 2/1999 | Borchering | |
| 5,870,557 A | 2/1999 | Bellovin | |
| 5,872,926 A | 2/1999 | Levac et al. | |
| 5,873,077 A | 2/1999 | Kanoh | |
| 5,873,080 A | 2/1999 | Coden | |
| 5,881,064 A | 3/1999 | Lin | |
| 5,883,891 A | 3/1999 | Williams | |
| 5,884,032 A | 3/1999 | Bateman et al. | |
| 5,884,262 A | 3/1999 | Wise | |
| 5,892,764 A | 4/1999 | Riemann | |
| 5,892,924 A | 4/1999 | Lyon et al. | |
| 5,905,736 A | 5/1999 | Ronen | |
| 5,905,777 A | 5/1999 | Foladare et al. | |
| 5,905,862 A | 5/1999 | Hoekstra | |
| 5,905,871 A | 5/1999 | Buskens | |
| 5,905,872 A | 5/1999 | DeSimone | |
| 5,907,547 A | 5/1999 | Foladare | |
| 5,907,602 A | 5/1999 | Peel | |
| 5,907,607 A | 5/1999 | Waters | |
| 5,915,008 A | 6/1999 | Dulman | |
| 5,923,659 A | 7/1999 | Curry | |
| 5,931,961 A | 8/1999 | Ranganathan et al. | |
| 5,940,479 A | 8/1999 | Guy et al. | |
| 5,946,299 A | 8/1999 | Blonder | |
| 5,959,996 A | 9/1999 | Byers | |
| 5,970,059 A | 10/1999 | Ahopelto | |
| 5,970,477 A | 10/1999 | Roden | |
| 5,999,965 A * | 12/1999 | Kelly | 709/202 |
| 6,003,030 A | 12/1999 | Kenner et al. | 707/10 |
| 6,009,469 A | 12/1999 | Mattaway et al. | |
| 6,011,794 A | 1/2000 | Mordowitz et al. | |
| 6,016,307 A | 1/2000 | Kaplan et al. | 370/238 |
| 6,020,915 A | 2/2000 | Bruno et al. | |
| 6,029,195 A * | 2/2000 | Herz | 709/219 |
| 6,031,904 A | 2/2000 | An | |
| 6,049,835 A * | 4/2000 | Gagnon | 709/245 |
| 6,064,653 A | 5/2000 | Farris | |
| 6,069,890 A | 5/2000 | White et al. | |
| 6,131,121 A * | 10/2000 | Mattaway et al. | 709/227 |
| 6,154,744 A * | 11/2000 | Kenner et al. | 707/10 |
| 6,175,870 B1 | 1/2001 | Gawlick et al. | 709/227 |
| 6,188,756 B1 | 2/2001 | Mashinsky | |
| 6,243,373 B1 | 6/2001 | Turock | |
| 6,377,576 B1 | 4/2002 | Zwick et al. | |
| 6,385,646 B1 * | 5/2002 | Brown et al. | 709/217 |

FOREIGN PATENT DOCUMENTS

| | | |
|---|---|---|
| EP | 0781016 A | 6/1997 |
| EP | 0802690 A | 10/1997 |
| JP | 09168033 A | 6/1997 |
| JP | 09168051 A | 6/1997 |
| JP | 09168063 A | 6/1997 |
| JP | 09168064 A | 6/1997 |
| JP | 09168065 A | 6/1997 |
| JP | 09171513 A | 6/1997 |
| JP | 09172459 A | 6/1997 |
| JP | 09172462 A | 6/1997 |
| WO | 9107839 A | 5/1991 |
| WO | 9501691 A | 1/1995 |
| WO | 9522221 A | 8/1995 |
| WO | 9620553 A | 7/1996 |
| WO | 9625720 A | 8/1996 |
| WO | 9619068 A | 9/1996 |
| WO | 9632800 A | 10/1996 |
| WO | 9634341 A | 10/1996 |
| WO | 9638018 A | 11/1996 |
| WO | 9638799 A | 12/1996 |
| WO | 9710668 A | 3/1997 |
| WO | 9714238 A | 4/1997 |
| WO | 9722211 A | 6/1997 |
| WO | 9722212 A | 6/1997 |
| WO | 9723078 A | 6/1997 |
| WO | 9728628 A | 8/1997 |
| WO | 9733412 A | 9/1997 |
| WO | 9812860 A | 3/1998 |
| WO | 9823080 A | 5/1998 |
| WO | 9834391 A 1 | 8/1998 |
| WO | 9834391 A 2 | 8/1998 |
| WO | 9834391 A 3 | 8/1998 |

OTHER PUBLICATIONS

NetSpeak Automated Call Distributor Server.
Vocal Tec—Strategy Internet Dial Tone: Beyond Voice.
NetSpeak—iCAD.
DataBeam A Primer on the T.120 Series Standard.
Comer, Douglas, "Internetworking With TCP/IP Vol 1: Principles, Protocols, and Architecture"; Third Ed.; Prentice Hall; 1995 pp. 127, 578.
Kaufman, H., "Call Centers in Cyberspace", Communications News, vol. 34, No. 7, Jul. 1, 1997, pp. 20–21.
Lautenbacher, et al, "Intelligent Internet: Value–Added Services by Interworking Between Network Technologies", ISS '97 WorldTelecommunications Congress, International Switching Symposium, Global Network Evolution: Convergence or Collision?, Toronto, Canada, Sep. 21–26, 1997.
MacPherson, "Why Call Centers Wont's Escape the World Wide Web", Business Communication Review, Hinsdale, IL, vol. 26, No. 6, Jun. 1996, pp. 39–41.
Norenkov et al,. "Telecommunication Technologies and Networks", Bauman MGTU Press, 1998, p. 80.
Sriram, Kotikalapudi et al., "Voice Packetization and Compression in Broadband ATM Networks," Apr. 1991, IEEE Journal on Selected Areas in Communications, Vol 9, No. 3, pp. 294–304.
"Net Telephony Spec Recommended," Communications Week , Mar. 17, 1997, p. 12.
"Internet by Satellite".
"Telephony on the Internet" (Workshop Information) presented by International Quality & Productivity Center, IMTC, and VOICE Technology & Services News, Sep. 26, 1996.
"Workstation Communications System" IBM Technical Disclosure Bulletin, vol. 37, No. 9, Sep. 1, 1994, pp. 101–104.
Abstract for 09168033 A, Patent Abstracts of Japan, 1997.
Abstract for 09168051 A, Patent Abstracts of Japan, 1997.
Abstract for 09168063 A, Patent Abstracts of Japan, 1997.

Abstract for 09168064 A, Patent Abstracts of Japan, 1997.
Abstract for 09168065 A, Patent Abstracts of Japan, 1997.
Abstract for 09172459 A, Patent Abstracts of Japan, 1997.
Abstract for 09172462 A, Patent Abstracts of Japan, 1997.
Aidarous et al., "The Role of the Element Management Layer in Network Management" Feb., 1994: pp. 59–69.
Bethony, Herb "HAHTSite Gives Pros Everything They Need," Mar., 1997, pp. 36–37.
Black, V. "OSI: A Model for Computer Communications Standards," Prentice—Hall, Inc. pp. 162–163, 1991.
Bohn, R. et al., "Mitigating the Coming Internet Crunch: Multiple Service Levels via Precedence," Journal of High Speed Network, vol. 3, No. 4, 1994, pp. 335–349.
Bolot et al.: "Scalable Feedback Control For Multicast Video Distribution In The Internet" Computer Communications Review, vol. 24, No. 4, Oct. 1, 1994, pp. 58–67.
Braun et al., "Implementation of an Internet Video Conferencing Application Over ATM," IEEE, 1997.
Chen et al., "ATM and Satellite Distribution of Multimedia Educational Courseware," Jun., 1996; pp. 1133–1137.
Civanlar et al., "FusionNet: Joining the Internet & Phone Networks for Multimedia Applications," 1996, pp. 431–432.
Cobbold et al., "Enhancement for Integrated Wireless Personal Communications Over metropolitan Area Networks," Apr., 1996: pp. 1370–1376.
Comer, Douglas, "Internetworking With TCP/IP Vol 1: Principles, Protocols, and Architecture"; Third Ed.; Prentice Hall; 1995 pp. 143–153.
Comerford, Richard, "Interactive Media: An Internet Reality," IEEE Spectrum, vol. 33, No. 4: pp. 29–32.
Davis, A.W.: "Videoconferencing Via Pots Now: Proprietary Codes & Emerging Standards" Advanced Imaging, Jan. 1, 1995, p. 32, 34, 36, 38 and 88.
Diehls, "Data's New Voice," BYTE Sep. 1996 pp. 129–135.
Duan et al., "Efficient Utilization of Multiple Channels Between Two Switches in ATM Networks," Feb., 1995: pp. 1906–1911.
Ejiri, Masayoshi, "For Whom the Advancing Service/Network Management," Feb., 1994: pp. 442–433.
Elia et al., "Skyplex: Distributed Up–link for Digital Television via Satellite," Dec., 1996: pp. 305–313.
Ely, Tom, "The Service Control Point as a Cross Network Integrator," Apr. , 1996: pp. 1–8.
Eriksson, Hans, "MBONE: The Multicast Backbone," Communications of the ACM, vol. 57, No. 8, Aug. 1994, pp. 54–60.
Estrin et al.: "Multimedia Over IP: Specs Show The Way" Data Communications, vol. 25, No. 10, Aug. 1, 1996, pp. 93–96 and 98.
Feinmann, "VIC Computer Telephony," Computer Telephony. Mar. 1996, pp. 219–221.
Fluckiger, Francois, "Multimedia Over The Internet" Proceedings of the European Conference on Multimedia Applications, Services and Techniques, vol. 1, May 28–30, 1996, pp. 3–8.
Fridisch et al, "Terminals for Accessing the Internet—The Internet Telephone," Alcatel Telecommunications Review—4th Quarter 1996. pp. 304–309.
Ganor, Elon,"Talk Talk," Tele.com, Jun. 1996, pp. 68–72.
Gareiss, Robin, "Voice Over the Internet," Sep., 1996 Data Communications, vol. 25, No. 12, 9/96, pp. 93, 94, 96, 98, 100.
Gralla, Preston, "How to Make Phone Call: How the Internet Works" Part 4, Chap. 21: pp. 118–119.
Gralla, Preston: "How The Internet Works" Communicating On The Internet, Chapter 12, pp. 64–67 1996.
Grami et al., "The Role of Satellites in the information Superhighway," Jun., 1995: pp. 1577–1581.
Gronert, et al: "Van Gateway Services: Easy Does It For E–Mail" Data Communications, vol. 23, No. 6, Apr. 1, 1994, pp. 63/64, 64B and 64D.
Gupta et al., "Technical Assessment of (T) INA–TMN–OSI Technology for Service Management Applications," Feb. 1994: pp. 877–887.
Gys, L. et al., "Intelligence in the Network" Alcatel Telecommunications Review, No. 1, 1998, pp. 13–22.
Halton, K. C.: "The Group 3 Facsimile Protocol" BT Technology Journal, vol. 12, No. 1, Jan. 1, 1994, pp. 61–69.
Hurwicz, Michael, "Faster Smarter Nets," Apr., 1997: pp. 83–89.
Inamori et al., "Applying TMN to a Distributed Communications Node System with Common Platform Software," Feb., 1995: pp. 83–87.
Jacobs, et al.: "Filling HTML Forms Simultaneously: Coweb–Architecture and Functionality" Computer Networks and ISDN Systems, vol. 28, 1996, pp. 1385–1395.
Jain, Surinder, "Evolving Existing Narrowband Networks Broadband Networks with IN Capabilities," Apr., 1996.
Kahn, Jeffery, "Videoconferencing Debuts on the Internet," Feb. 28, 1995.
Katz, et al.: "MMCX Server Delivers Multimedia Here and Now" AT&T Technology, vol. 10, No. 4, Dec. 1, 1995, pp. 2–6.
Kelly, Katy, "Mountaintop Office Keeps Skiers in Touch," USA Today vol. 15, No. 112.
Kim, Gary, "Talk is Cheap," America's Network, Jul. 15, 1996: pp. 34–39.
Kishimoto, Royozo, "Agent Communication System for Multimedia Communication Services," Mar., 1996: pp. 10–17.
Koch et al: "'Gruppe 3' Brachte Den Schneeballeffekt," Funkschau, No. 2, Jan. 15, 1988, pp. 48–50.
Kolarov et al., "End–to–End Adaptive Rate Based Congestion Control Scheme for ABR Service in Wide Area ATM Networks," Feb., 1995: pp. 138–143.
Kumar, Vinay, "Internet Multicasting: Internet'Next Big Thing," ICAST Corp. 1997.
Lapolla, Stephanie, PC Week, "Net Call Centers, Voice to Merge", Mar. 31, 1997, p. 10.
Li, C. et al., "Time–Driven Priority Flow Control for Real-Time Heterogeneous Internetworking," Proceedings in Computer Communications, Fifteenth Annual Joint Conference of the IEEE Computer and Communication Generation, San Francisco, Mar. 24–28, 1996, vol. 1 Conf., Mar. 24, 1996, IEEE, pp. 189–197.
Louth, Nick, Reuters, "MCI Communications Corporation Vaults Phone–Data Divide" MCI Communications Corp. news page, Jan. 29, 1997, web page attached.
Low, C., "The Internet Telephony Red Herring", HP Laboratories Technical Report, May 15, 1996, pp. 1–15.
Low, C. et al., "Webin—An Architecture For Fast Development of In–Based Personal Services" Workshop Record Intelligent Network. Freedom and Flexibility: Realizing the Promise of Intelligent Network Services, Apr. 21, 1996, pp. 1–12.
Lubich, Dr. Hannes P., "Videoconferencing For MAC and PC–Initial Experiences With 'CU–SEEME'" Switch Journal, No. 1, 1995, pp. 4–9.

Macedonia et al., "Mbone Provides Audio and Video Across the Internet," Apr. 1994, pp. 30–36.

Maeno et al. "Distributed Desktop Conferencing System (Mermaid) Based On Group Communication Architecture" Communications—Rising to the Heights, Denver, Jun. 23–26, 1991, vol. 1, Jun. 23, 1991, pp. 520–525.

Margulies, Ed, "CT's Cyberdate with The Net," Aug., 1996, Computer Telephony Periscope, pp. 28–29.

Matsuo et al.: "Personal Telephone Services Using IC–Cards" IEEE Communications Magazine, vol. 27, No. 7, Jul. 1989, pp. 41–48.

Matta, I., et al., "Proceedings of the Conference on Computer Communications" IEEE, issue 3, 1994, pp. 492–499.

Miller, Mark, "Troubleshooting TCP/IP," Managing the Internet, Chapter 7, 1992, pp. 365–375.

Newton, Harry, "The Personal Side of CT" Computer Telephony Jan., 1997, pp. 12–14.

Oppen et al.: "The Clearinghouse: A Decentralized Agent For Locating Named Objects In A Distributed Environment" ACM Transactions on Office Information Systems, vol. 1, No. 3, Jul. 1983, pp. 230–253.

Patel et al., "The Multimedia Fax–Mime Gateway" IEEE Multimedia, vol. 1, No. 4, Dec. 21, 1994, pp. 64–70.

Peeren, Rene "The Intelligent Web," Apr., IEE 1996: vol. 1.

Perret et al., "MAP: Mobile Assistant Programming for Large Scale Communications Networks," Apr., 1996: pp. 1128–1132.

Pezzutti, David, "Operations Issued for Advanced Intelligent Networks," IEEE Communications Magazine, Feb. 1992, pp. 58–63.

Platt, Richard, "Why IsoEthernet Will Change the Voice and Video Worlds," IEE Communications Magazine, Apr., 1996, pp. 55–59.

Retkwa, Rosalyn "Telephone Politics," Internet World, Jun. 1996, pp. 54–60.

Schreyer et al., "Least Cost Call Routing," Apr., 1996: pp. 12–17.

Schulzrinne, Henning, "A Comprehensive Multimedia Control Architecture For The Internet" Proceedings of the IEEE 7$^{th}$ International Workshop on Network and Operating System Support for Digital Audio and Video, May 19–21, 1997, pp. 65–76.

Schulzrinne, Henning, "RFC 1889– RTP: A Transport Protocol for Real–Time Applications," 1/96.

Schulzrinne, Henning, "RFC 1890– RTP: Profile for Audio and Video Conferences with Minimal Control," Jan., 1996.

Sclavos, et al., "Information Model: From Abstraction to Application," Feb., 1994: pp. 183–195.

Serrano, Inma R., "Evolution of Hybrid Fibre Coaxial Network for Multimedia Interactive Services," British Telecommunications Engineering, Oct., 1996, pp. 249–253.

Sharp, C. D.and K. Clegg, "Advanced intelligent Networks—Now a Reality," Electronics & Communication Engineering Journal, Jun., 1994, pp. 153–162.

Simeonov, Plamen L. et al.: "INGate: A Distributed Intelligent Network Approach to Bridge Switching and Packet Networks" Proceedings of Sixth International Conference on Computer Communications and Networks, 09/22–25/97, pp. 358–363.

Sullivan, K. B., "Videoconferencing Arrives on the Internet," Aug., 1996.

Sunaga et al., "A Reliable Communication Switching Platform for Quick Provisioning," Feb., 1995: pp. 77–82.

Tagg E.: "Automating Operator–Assisted Calls Using Voice Recognition" Speech Technology, Man–Machine Voice Communications, vol. 4, No. 2, Mar. 1988, pp. 22–25.

The Wall Street Journal, "MCI's New Service for Corporate Use Sets 1 Line for Net, Phone", Jan. 30, 1997, web page attached.

Tsuchida et al., "Intelligent Dynamic Service Provisioning Architecture in the Multimedia Era," Communications—Gateway to Globalization. Apr., 1996: pp. 1117–1122.

Turletti Thierry: "The Inria Videoconferencing System (IVS)" Connections, Oct. 1, 1994, pp. 20–24.

Williebeck–Lemair, Marc H.& Zon—Yin Shae, "Videoconferencing Over Packet–Based Networks," IEEE Journal on Selected Areas in Communications, vol. 15, No. 6, Aug. 1997 pp. 1101 to 1114.

Yang, C University of North Texas.: "INETPhone: Telephone Services and Servers on the Internet" Apr. 1995; Network Working Group; Request for Comments: 1789; Category: Informational.

Yeager, Nancy, & McGrath, Robert "Web Server Technology, The Advanced Guide for World Wide Web Information Providers" Chapter 6: Searching for Information on the Web, 6.8.2 Using Databases as Indexes to a Document Collection 1996 p. 250.

* cited by examiner

METHOD AND SYSTEM FOR MULTI-MEDIA COLLABORATION BETWEEN REMOTE PARTIES

CROSS-REFERENCE TO RELATED APPLICATIONS

U.S. patent application Ser. No. 08/751,023, filed Nov. 18, 1996, now abandoned and U.S. patent application No. 08/798,350, filed Feb. 10, 1997, now abandoned, are commonly assigned and are hereby incorporated by reference in their entirety.

The following U.S. patents and commonly assigned patent applications are hereby incorporated herein by reference:

| U.S. Pat. or Ser. No. | Filing Date | Issue Date | Attorney Docket No. | |
|---|---|---|---|---|
| 08/751,023 | Nov. 18, 1996 | Jan. 6, 1998 | VON-96-001 | now U.S. Pat. No. 5,706,248 |
| 08/798,350 | Feb. 10, 1997 | | VON-97-004 | now abandoned |

FIELD OF THE INVENTION

This invention relates generally to computer networks and specifically to a method and system for multi-media collaboration between remote parties.

BACKGROUND OF THE INVENTION

Since the use of the public Internet has become increasingly popular as one of the world's premier sources of communications, new and innovative technologies have been developed to tap into the Internet's vast resources. This new form of communication has sprouted numerous technological innovations and services that benefit both consumers and industry.

Multi-media collaboration services allow two or more parties to exchange information in a conference setting. These services can be readily provided over the Internet and include collaborative Web browsing, audio conferencing, video conferencing, and application sharing. Many opportunities exist to provide enhanced customer services, product support, technical support, sales services, training, and other business services.

SUMMARY OF THE INVENTION

The present invention provides a method and system for communicating with a plurality of remote parties. This method and system allows for multi-media collaboration. A first party, which may be an agent in a call center, receives requests for access from first and second remote parties. Each of these remote parties is provided access to a computer program and a session is initiated for each party. The first party can then independently communicate with the first and second remote parties via the computer program.

In another aspect, a method of communicating with a remote party begins with the initiation of a link over an internet, such as the public Internet. While maintaining this link, a number of web sites may be viewed. Each of these web sites may be addressed by a unique URL (universal resource location). The viewing party can then selectively push the URL for some but not necessarily all of the viewed web sites to the remote party. This method is useful for customer information and assistance, on-line training and other collaborative browsing applications.

The present invention provides a number of advantages over prior art systems and methods. The preferred embodiment is a network-based solution and uses shared resources (e.g., a session server and a web server) for multiple customers. This is enabled, at least in part, by the present invention's methods for access, security and billing. The system has advantages over the cited prior art which relies on dedicated customer premise equipment (CPE). The present invention also enables services for one-to-many and many-to-many IP-based collaboration using, for example, URL push.

The preferred embodiment of the present invention also enables control of URL push. A user decides which (if any) URL to push to a remote party. This feature of present invention also allows the user and the remote party to browse independently of each other. When the user decides to push the URL to the remote party, that URL is pushed and the remote party's browser goes to that URL site. But the remote party can then go elsewhere. The remote party can also disable the URL trigger, for example, by hitting the escape key or by closing the program that allows for collaboration.

In the present invention, the user is allowed to pass control of URL push to the remote party. At that point either the user or the remote party (or only the remote party) can push URLs. The user can then take back control.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

Figure 1:
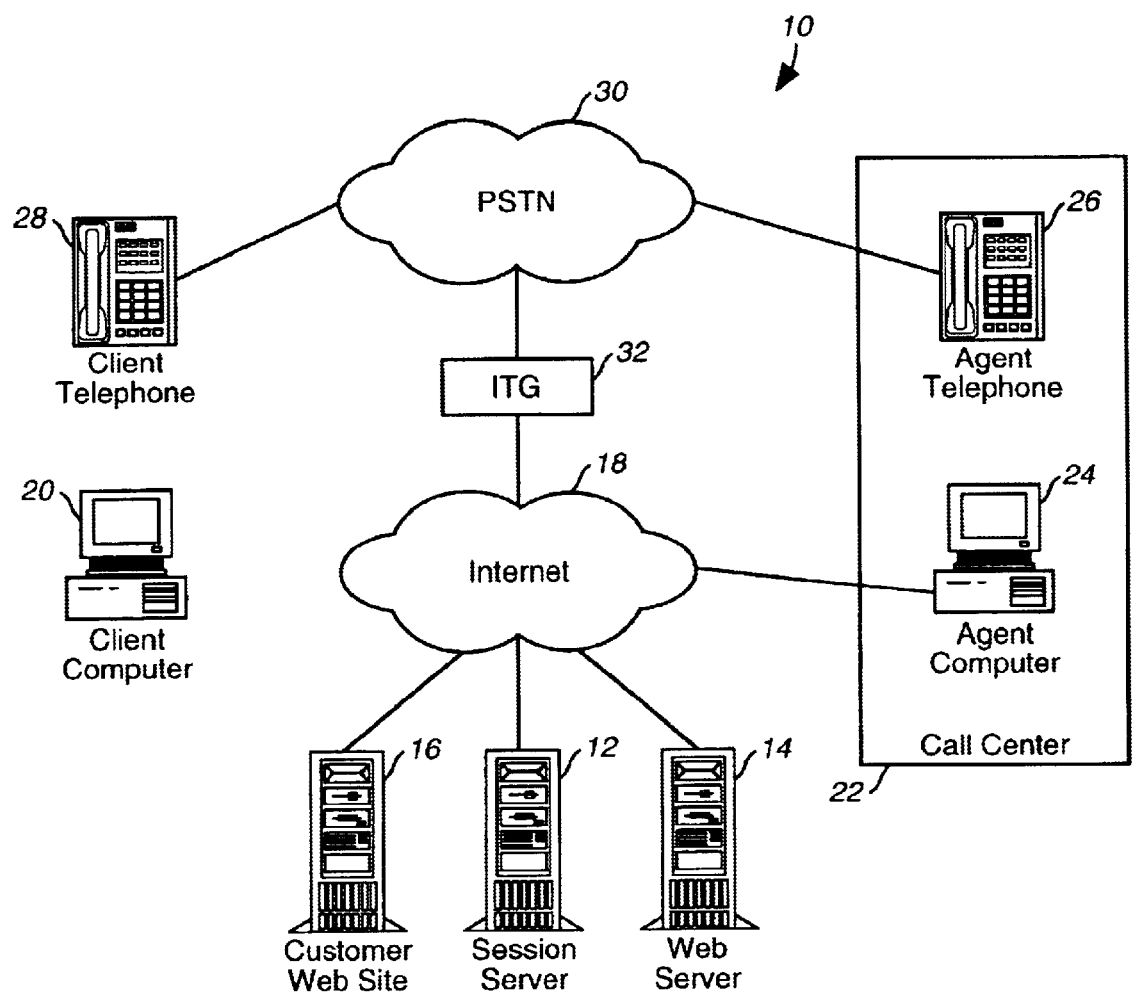
FIG. 1 is a block diagram of an exemplary system architecture.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

This Detailed Description will first provide a broad overview of some of the relevant points of the present invention. The system and some discussion of the elements will then be described with respect to FIG. 1. The preferred method of operation and some examples will then be provided.

To begin the overview, one aspect of the present invention provides a communications system architecture which utilizes a session server and multi-media collaboration technology to provide collaborative Web browsing among multiple parties. The system can also provide other network-based multi-media collaboration services for call centers. The preferred embodiment uses shared network resources to provide multi-media collaboration services for multiple customers and overcomes many limitations found in the prior art.

Multi-media collaboration refers to the use of more than one media stream (e.g.: voice, fax, data, video, etc.) used in collaboration with more than one party. There are many examples of multimedia collaboration. Some of these include FTP (file transfer protocol), e-mail, web browsing, chat, telephony, multi-party conferencing, audio-on-demand, video-on-demand, integrated messaging, virtual private networks, and electronic commerce.

The preferred embodiment is a network solution that does not rely on customer premise equipment (CPE). Thus, a business can provide collaboration services to many different customers and call centers. This preferred embodiment feature can be enabled by use of the present invention's session access, security, and/or billing techniques.

The system and method of the present invention can also enable services for one-to-many and many-to-many IP-based collaboration. For example, one agent can engage in a collaborative Web browsing session with several different clients, e.g., pushing URLs to each of the clients. Multiple agents can also be involved in a collaborative browsing session with one or more clients.

In one aspect, the present invention can also enable control of media sharing features, in that one party (e.g., a call center agent) can decide which media to share, and can also pass control of media sharing to another party (e.g., a client).

In another embodiment, the present invention enables control of media sharing features (URL push, for example), in that one party (e.g., a call center agent) can decide which media to share. In the preferred embodiment, URL push, and other media-sharing features, are controlled by Java applets that run on the agent's and client's computers. These applets operate independently from the Web browser, and in a separate window. In this embodiment, therefore, the agent and client can browse the Web independent of each other. When the agent decides to push a URL (universal resource location) to a client, that URL is pushed and the client's browser goes to the URL site. The client can then go elsewhere, or can even disable the URL trigger, e.g., by hitting the escape key on the Web browser window or closing the applet window.

In addition, the Java applet that runs on the agent's computer allows the agent to pass control of URL push to the client and then take control back.

Another feature of the preferred embodiment is historical tracking of URLs. This feature can be enabled by the Java applets that run on agents' and clients' computers. In this aspect, a list of URLs that have been pushed in a session is maintained on the session server. Thus, any agent or client that is logged into a session can select a URL from this list and push it. URLs are but one example of media, and URL push is but one example of a media-sharing feature provided by the present invention. The URLs which are pushed can be many forms, for example, any or all of data, graphics, video, and audio can be pushed.

The present invention can be better understood with reference to the drawings which will now be discussed in detail. FIG. 1 illustrates the network architecture 10 of the preferred embodiment of the present invention. The preferred embodiment uses shared network resources, as represented here by a session server 12 and a web server 14 to provide services for a plurality parties such as call centers, agents, and clients. Other shared resources such as a customer web site 16 can also be included in the network.

The present invention provides a method and system for communications between remote parties. Parties are considered to be remote from each other when they are separated by a network 18. In cases, such as the one illustrated in FIG. 1, when the parties are separated by the public Internet, the parties may be literally remote, for example, across the world. In other cases, however, such as when network 18 is a corporate intranet, the remote parties may be physically close to one another.

As alluded to above, communications between the parties can be made over a variety of networks 18. A network 18 is at least two (and preferably more) computers interconnected together so that communication between them is possible. In the illustrated embodiment, the public Internet is shown as an exemplary Internet Protocol-based (IP-based) network 18 for multi-media collaboration. In this context, the "Internet" (uppercase "I") is used to connote the worldwide collection of interconnected networks that uses Internet Protocol to link the large number of physical networks into a single logical network. Physically, the Internet is a huge, global network spanning nearly 100 countries and comprising a great number of academic, commercial, government, and military networks.

Network 18 could also comprise other IP-based networks as well as other networks. For example, network 18 could comprise an internet which is not connected to the public Internet. In this context, an "internet" (lowercase "i") is any collection of separate physical networks, interconnected by a common protocol, to form a single logical network. An internet would preferably, but not necessary use Internet Protocol. An internet which is owned by a single entity sometimes referred to as an intranet. Network 18 can comprise an intranet, which is or is not connected to the Internet. For example, network 18 can be either a public or a carrier supported virtual private network (VPN) or local area network (LAN) which uses IP or IP-tunneling. Other protocols can alternatively be utilized.

In the preferred embodiment, a client computer 20 communicates with call center 22 via network 18. A call center is any company, organization, person or entity that is responsible for servicing a form of communication. It could be one person at a telephone, fax or communication end device that services the communication. Alternatively, it could be a 200-seat traditional call center.

Call center 22 may consist of several agent workstations 24. In the preferred embodiment, an agent workstation comprises an agent computer 24 (regardless of platform, processor-type or operating system) which runs a Web browser and customer service application software. The agent workstation will typically also include an agent telephone 26 (e.g., a traditional analog telephone).

With a call center, there are a number of relevant parties. In each case, a party may be a human being with a communication device (e.g., telephone, fax, computer) or a computer which is in communication with the other parties. The "client" is the party or parties which desire communication with the call center 22. (Note that a "client" in this context is not necessarily a "client" as it applies in the "client-server" model of communications even though they may be the same in some contexts.) The agent is the party or parties at call center 22 which respond to the client. The customer is the party which has contracted with the call center to communicate with the client. In some cases, the customer and the call center agents may all be affiliated with the same organization (e.g., when a company implements its own call center). In other cases, a customer contracts with a service provider so that the service provider provides the call center for the customer.

Before continuing with the description of the FIG. 1 system, it may be useful to describe but one of the applications for such a system 10 so that the reader may have a context in which to consider the invention. In this example, the call center 22 serves as a customer service center for a company (i.e., a customer). The customer service center employs a number of customer service agents, each of which uses an agent workstation (e.g., computer 24 and telephone 26). In this example, the clients are consumers who call the customer service center with questions about products purchased from the company (i.e., the customer). Each consumer (i.e., client) will be assisted by one or more agents. In other examples, an agent or agents could assist multiple customers.

Returning to FIG. 1, client computer 20 is typically a personal computer (regardless of platform, processor type or operating system) with a Web browser and Internet access. Computer 20 may alternatively comprise a network of computers (e.g., for corporate clients using a local area network or other network), a multiprocessor computer such as a workstation, or a terminal which only allows access to network 18 (e.g., WebTV). For the purpose of this invention, the precise hardware is not critical. Rather, it is the functionality of the hardware which is important. Client computer 20 must be able to operate in manner consistent with whichever embodiment is desired.

Client computer 20 can be connected to the network 18 in any of a number of ways. This connection is not critical to the present invention. For example, the client computer 20 may have a modem (analog or digital), a cable modem, a wireless link (e.g., satellite or cellular), a T1 line, or digital subscriber line (e.g., ADSL). The client computer 20 can also be connected to a network. For example, client computer 20 could be connected to a corporate intranet which includes a gateway to the Internet.

Client computer 20 may also be equipped with other software such as Internet telephone software, for placing Internet telephone calls. A client may also have a traditional telephone 28 for placing calls to call center agents over the public switched telephone network (PSTN) 30.

Session server 12 is software that manages communication sessions among one or more agents and one or more clients. In FIG. 1, session server 12 is represented by a single computer. It is noted, however, that the session server 12 may just as easily operate over a number of computers which may be physically close together or found at remote locations many miles apart. For the purposes of this invention, the hardware is not critical. The emphasis, rather, is on the functionality of that hardware.

In its preferred embodiment, the session server 12 is a conference server that follows the ITU T.120 standard, which is incorporated herein by reference. The T.120 standard contains a series of communication and application protocols and services that provide support for real-time, multi-point data communications. Session server 12 is preferably able to set up to conduct video conferences, audio conferences, and data conferences with application sharing. Collaborative Web browsing can also be enabled with URL push technology. During the course of a collaborative session, one party can push a URL to another party. In other words, one party can cause the browser of a remote party to connect to a certain web site.

Web server 14 provides software for communication with client computer 20. While illustrated as being run on a single computer 14, web server 12 can operate on one or more computers, including the same one or ones that session server 12 is operating on. Web server 14 is preferable platform independent from client computer 20.

In the preferred embodiment, web server 14 provides a Web site for Internet telephony services. In one embodiment web server 14 is MCI's Click 'n Connect™ Web Server, which provides clients with selections for placing an Internet telephony call to an Internet termination, placing an Internet telephony call to a PSTN termination, and placing callback requests. Internet telephony transactions are facilitated by internet telephone gateway (ITG) 32 which is provided as an interface between the circuit-switched PSTN 30 and the packet switched IP network 18. Terminations are generally call centers such as call center 22.

Figure 2:
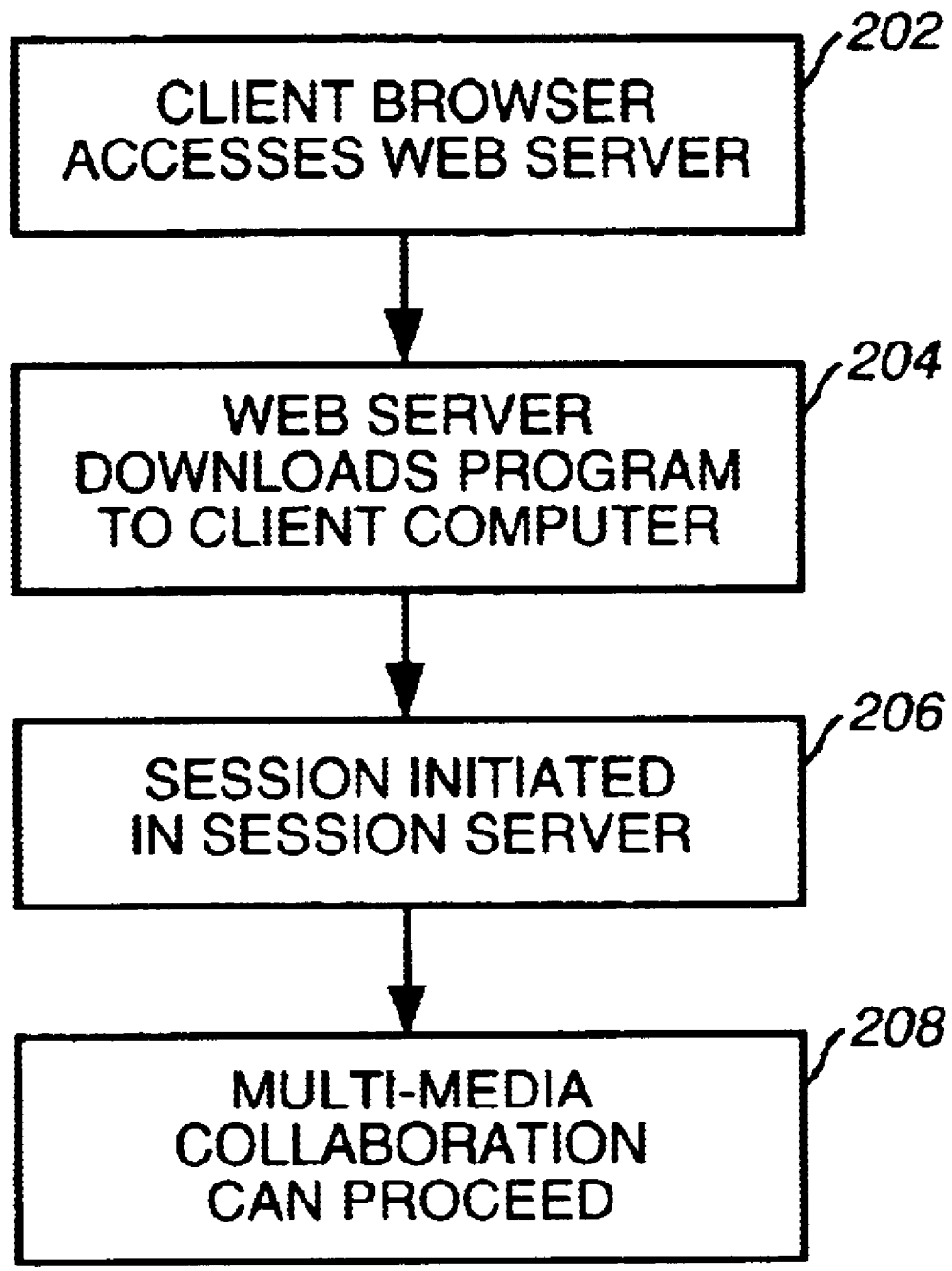
FIG. 2 is a flowchart of one method of initiating a link between remote parties.

Referring now to FIG. 2 along with FIG. 1, an example of operation of the present invention will be described. In the preferred embodiment, the client computer 20 accesses the web server 14. This operation is shown in step 202 of FIG. 2. When web server 14 is accessed by a client browser, the Web site causes the client computer 14 to run a program (e.g., a program is provided to the RAM within client computer 14) which enables remote access to the browser as shown in step 204. In the preferred embodiment, web server 14 downloads to the client computer 20 a Java applet, which is automatically launched. The Java applet can be run stand-alone or with a real-time Java run time engine in the browser. A Java applet is convenient since it is designed to run on any type of computer but other languages or types of computer programs could alternatively be used. In this context, a Java applet is meant to refer to any computer program which can be downloaded and run on client computer 14.

In another embodiment, the program could already be resident on the client computer 14 (e.g., in a non-volatile storage media such as the hard driver, a CD-ROM or a DVD) when it is caused to be run.

In the preferred embodiment, the Java applet runs on client computer 20 in a window that is separate from the client's Web browser. This program, in step 206, causes client computer 20 to initiate a session with session server 12. A session begins when the two computers begin communicating and continues until the communication ceases. For example, the program may provide a session identifier (ID) and log the client into a session. While the Java applet is logging the client into a session, the client can browse the Web independently, since the applet is a separate process from the Web browser. The applet's window displays the progress of the call to the session server 12 and the establishment of the session.

Once a session is established, multi-media collaboration between the agent and client is enabled as illustrated in step 208. For example, the Java applet running on the client computer 20 will monitor the client computer's IP socket connection for incoming URLs. When a URL is pushed by an agent or another client, the applet will feed that URL to the client's Web browser, which will then go to the Web site addressed by the URL. Other types of collaboration such as audio, video or data conferencing can also be performed.

The web server 14 can download various Java applets for establishing different types of sessions. These include video conferencing, audio conferencing, data conferencing, and collaborative browsing. When downloaded and executed, the applet will take the client to the session server 12, execute on the client computer 20 the appropriate application for participating in a particular type of session (e.g., a video application for video conferences or an Internet telephone application for audio conferences), log the client into the session with a session ID, and then conduct that session (e.g., for a collaborative browsing session, the applet will accept URL pushes from an agent and feed them to the browser).

On the client computer 20, a window is open for a Web browser, and another window is open for the Java applet. The applet receives URLs and feeds them to the Web browser. In this manner, the browser can engage in collaborative Web browsing by receiving pushed URLs while still running independently. Thus, a client can receive a URL and go to that Web site, then browse independently, or even disable the URL, for example, by hitting the escape key in the browser window or closing the Java applet window. In one embodiment, the applet can provide the client with an option to selectively receive URL pushes, for example, only after an affirmative indication from the client.

On the agent computer 24, a similar Java applet runs, as well as a Web browser. A "URL push" button (e.g., icon) is provided in the Java applet's GUI (or, alternatively, hardwired, e.g., into the keyboard of agent computer 24). Using his Web browser, an agent can browse several Web sites without pushing anything to a client. When the agent reaches a Web site that he wants the client to see, the agent clicks the "URL push" button. This causes the browser's current URL to be pushed to the client, or anyone else logged into the current session. The agent computer 24 is also equipped (embodied in the Java applet) with an box (or icon) that allows the agent to simply enter a URL to be pushed.

Thus, in the preferred embodiment, the Java applet that runs on the client computer 20 maintains communications with the session server 12, receives URL pushes over an IP socket, and feeds those URLs to the Web browser. It also allows the client to push URLs, when this feature is enabled by the agent. The Java applet that runs on the agent computer 24, in addition to these functions, can also manage control of the URL push feature. The agent can pass control of URL push to the client.

In addition, the session server 12 maintains a list of all URLs that have been pushed in a session. This list is displayed on the agent computer 24. An agent can select a previously pushed URL, even if it was pushed by another agent or a client, and push it to others.

In the preferred embodiment, an agent can log onto the session server 12 and see all sessions in progress. For example, the agent logs into the session server 12 with, for example, a business account name or number, an agent ID, and a password. The business account partitions sessions for different customers on the same session server, allowing the session server to be shared among multiple customers, while providing security so that one customer's agents cannot view the sessions of another customer.

When an agent logs in this way, she sees the sessions in progress for her customer. The agent can also see who (e.g., clients and agents) is currently logged into each session. In a typical application, an agent will log into the session server 12 upon arriving at work and remain there throughout the shift. She can view a display of all sessions in progress and log into a particular session, such as one without another agent.

The present invention uses the session server 12 to conduct multiple 1:1, 1:n, n:1, and n:n sessions (referring to, for example, agents:clients) for multiple customers (e.g., businesses). When a client places an Internet telephone call to an agent, he can be automatically placed in a session on the session server 12 in a manner that is transparent to him. That is, it appears to the client that there is a one-to-one direct link with an agent. This is only one example of its use.

One aspect of the present invention is that it allows for independent communication with a number of remote parties. For example, call center 22 may be in simultaneous communication with a plurality of client computers 20. Call center 22 can communicate independently with each of the client computers 20. In this context, communicating independently is defined as communicating with either one, some or all of the clients simultaneously where communication with one party does not affect communication with another party unless the agent so chooses. This allows the same or different agents to be able to pick and choose which client or clients will receive which particular communications.

The first function of the preferred embodiment of the invention is to get a client logged onto a session on the session server for multi-media collaboration. There are many methods available. Four examples follow:

1. Client places a telephone call over the PSTN 30 to a call center 22 agent, using a toll-free 800/888 number, for example. The agent determines that a multi-media collaboration session is needed, and asks the client if the client has a computer and Web access. Assuming the client responds affirmatively, the agent provides the client (over the phone) with a URL for a web site that is supported by the web server 16 in FIG. 1. The client enters the URL in their Web browser and goes to that Web site (step 202 in FIG. 2). That Web site then downloads and launches the Java applet on the client browser (step 204). This Java applet takes the client to the session server 12, provides a session ID (a plurality of which are maintained on and provided by the Web server), and logs the client into the appropriate session (step 206). The Java applet also displays the session ID on the client computer. The client tells the agent this session ID and the agent then logs into that same session. Alternately, the agent, being already logged into the session server 12, sees all sessions in progress for the agent's particular business. The agent can thus view when a client logs into a session, and log into that session. This is useful if the client has only one phone line and cannot remain on the phone with the agent while browsing the Web. The client then begins accepting URLs from the agent (step 208).

2. Client places an Internet telephony call to a call center agent, using the client computer and an Internet telephone software application (step 202). For example, the client can use MCI's Click 'n Connect™ service. The Internet telephony "dialed number" actually places the call to the Web Server 14. Web server 14 downloads and launches the Java applet on the client computer 20 (step 204). This Java applet takes the client to the session server 12, provides a session ID, and logs the client into the appropriate session (step 206). An agent who is logged into the session server 12 sees a new client log into a session. If another agent is not already logged into that same session, this agent logs in. Multi-media collaboration can then proceed (step 208).

3. Client browses the Web and accesses a customer's (any business) Web site. A Customer Web Site 16 is shown in FIG. 1 as connected to the Internet 18. The client decides that he wants to interface with a customer service agent and clicks an HTML link for this very function (step 202). This takes the client to the web server 14, from which the Java applet is downloaded and launched (step 204). A session ID that corresponds with the customer is provided, and the client is logged into a session for that customer (step 206). Multi-media collaboration can then proceed (step 208).

4. Client can access the web server 14 and place a callback request. This can be either an immediate callback request (if client has two lines) or a delayed callback request. Call-back is described in more detail in co-pending patent application Ser. No. 08/798,350, now abandoned, (attorney docket VON-97004) which is incorporated herein by reference. Callback can be placed by an agent to the client over the Internet 18 or PSTN 30. When the callback is placed, the agent instructs client to go to the Web site, and proceed as in example 1 above.

The present invention can also be utilized in other applications. For example, during a session URLs can be pushed for collaborative Web browsing. In addition, since a multimedia Session Server 12 is used, other types of data can be shared. First a client computer 20 will be logged onto the session server 12 and an IP socket connection established will be established. From that point, the session may proceed with collaborative browsing, audio conferencing, video conferencing, or data conferencing. The URL push described above is simply one example of media sharing.

As noted previously, the Java applet that runs on the agent computer 24 provides a button for passing control of URL push to the client. When this button is selected by the agent, it triggers the session server 12 to enable a feature on the client's Java applet for URL push. Preferably, the software will be configured to that the agent can take back control at any time.

Since IP is a session-less protocol, the session server 12 maintains sessions. If one or more clients are logged into a session without any agent being logged in for a certain amount of time, the session server 12 preferably should terminate the session. This function can be accomplished with a time-out facility on the session server 12.

Security for providing sessions to multiple customers on a shared session server 12 is enabled with the use of business accounts and agent passwords.

The present invention also includes aspects which contemplate billing. For example, the session server 12 can create event records for each session. Included in each event record is the session ID These event records can then be fed to a billing system (not shown). The billing system may be operated on the same computer(s) as session server 12 and/or session server 14 or on another computer (which is or is not connected to network 18). The use of session ID's enables the billing of multiple customers using the same session server 12. Examples of events include:

Agent #4 logged into session #99 at 12:01.

Agent #4 pushed URL *** at 12:02.

Agent #4 pushed URL *** at 12:04.

Agent #4 logged out of session #99 at 12:15.

Agent #5 ended session #98 at 12:30.

Session #97 timed-out with no agent log-on at 12:40.

Events can be written to an event log on a database server (not shown). While the database server is not explicitly illustrated, it can reside on the same computer(s) as session server 12 and/or web server 14 or on a different computer(s). Event records are then retrieved according to session ID, correlated, and used to created billing records. Billing can be based on any event, including transactional billing based on URL pushes (e.g., $0.05 per URL push).

At this point, it would be useful to provide additional examples of the use of the present invention. In the first example, a plurality of agents can push URLs to a single client. This is useful for multilevel support. An agent, representing a first level support, can collaborate with a client and push several URLs to that client. The first level support agent may then need to refer to a second level support agent. The second level support agent can log into the session and see the URLs that have been pushed. The second agent can then push additional URLs, or select one that has already been pushed. The first level agent can stay in the session and see what the second level agent is doing, or can drop out.

In another example, a single agent can push URLs to a plurality of clients. This is useful for on-line training and instruction, or for chat room style of customer support.

In any of these applications, a supervisor agent can monitor the session conducted by another agent by seeing the URLs pushed by that agent.

As discussed above, the present invention can be used in a variety of contexts. For example, a client may go to the web site of a news agency and ask to be notified when (or if) a certain event occurs. The web site could then launch a Java applet as described herein and connect to a session server. Upon occurrence of the specified event, a URL could be pushed to the clients browser which would display the information to the user. In one particular example, a client may log into the web site of an airlines and ask to be notified when a particular flight takes off or may log into the web site of his broker and ask when a stock hits a certain price.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating with a plurality of remote parties, the method comprising the steps of:

receiving a first request for access from a first remote party;

initiating execution of a computer program at the first remote party;

commencing a first session with the first remote party;

receiving a second request for access from a second remote party;

initiating execution of the computer program by the second remote party;

commencing a second session for the second remote party;

independently communicating with the first and second remote parties via the computer program provided to each of the first and second remote parties, the communicating step including a multi-media collaboration; and pushing uniform resource locators to the first and second remote parties.

2. The method of claim 1 wherein at least one of the first and second request for access is received at a call center.

3. The method of claim 1 wherein at least one of the steps of receiving the first request for access and receiving the second request for access is comprises receiving a communication via an internet.

4. The method of claim 3 and further comprising the steps of:

receiving a telephone call from a caller; and providing the caller with a Uniform Resource Locator (URL).

5. The method of claim 3 wherein at least one of the steps of receiving the first request for access and receiving the second request comprises receiving an Internet telephony call.

6. The method of claim 3 wherein at least one of the steps of receiving the first request for access and receiving the second request comprises receiving a call-back request.

7. The method of claim 3 wherein the internet comprises the Internet.

8. The method of claim 1 wherein the multi-media collaboration comprises collaborative web browsing.

9. The method of claim 1 wherein the multi-media collaboration comprises video conferencing.

10. The method of claim 1 wherein the multi-media collaboration comprises audio conferencing.

11. The method of claim 1 wherein the multi-media collaboration comprises application sharing.

12. The method of claim 1 and further comprising the step of keeping track of communications with each of the first and second remote parties.

13. The method of claim 12 and further comprising the step of compiling a billing record for each of the first and second remote parties.

14. The method of claim 1 wherein the computer program initiates the first session.

15. A method of operating a call center, the method comprising the steps of:

a first agent logging into a session server;

a second agent logging into the session server;

receiving an information request from a first client for a first customer;

routing the first client to the first agent;

providing a computer program to the first client;

logging the first client into the session server;

communicating with the first client over a computer network;

receiving an information request from a second client for a second customer;

routing the second client to the second agent;

providing the computer program to the second client;

logging the second client into the session server;

receiving an information request from a third client for the second customer;

routing the third client to the second agent;

providing the computer program to the third client;

logging the third client into the session server;

independently communicating with the second and third clients over the computer network, the communicating including pushing uniform resource locators to the first, second and third clients; and maintaining transaction records which record the communications with the first, second and third clients.

16. The method of claim 15 wherein the computer network comprises the Internet.

17. The method of claim 15 and further comprising the step of preventing the first agent from viewing the communications of the second agent.

18. The method of claim 15 and further comprising the step of compiling a billing record from the transaction records.

19. A method of communicating with a remote party comprising:

receiving a request from a remote party;

in response to the request, commencing a link between a call center and the remote party over an internet;

communicating an applet from the call center to the remote party for execution by the remote party;

pushing a first Uniform Resource Locator (URL) from the call center to the remote party such that the call center causes the remote party to connect to a first web site; and pushing a second URL from the remote party to the call center such that the remote party causes the call center to connect to a second web site.

20. A method of communicating with a remote party comprising:

receiving an internet telephone call from a remote party;

providing a first Uniform Resource Locator (URL) of a call center to the remote party;

connecting the remote party to the call center over an internet using the first URL;

communicating an applet from the call center to the remote party for execution by the remote party;

pushing a first URL from the call center to the remote party such that the call center causes the remote party to connect to a first web site; and pushing a second URL from the remote party to the call center such that the remote party causes the call center to connect to a second web site.

21. A method of multimedia communication between a client and a server, comprising:

receiving a session request from the client via a client computer having web browser software;

in response to the session request, commencing a link between the server and the client computer over an internet;

communicating a Java applet from the server to the client computer for execution by client computer, wherein the Java applet is executed in a window of the client computer that is separate from the web browser;

initiating a communication session between the server and the client computer in response to the executed Java applet; and selectively pushing a first Uniform Resource Locator (URL) from the server to the client computer such that the client computer connects to a first web site using its web browser, as such the communication session and web browser are executed by the client computer in parallel and the client computer can view the first web site without terminating the communication session.

22. The method of claim 14, further comprising:

creating a billing record for the remote party based on a number of Uniform Resource Locators pushed from the call center to the remote party.

23. The method of claim 20, further comprising:

creating a billing record for the remote party based on a number of Uniform Resource Locators pushed from the call center to the remote party.

24. The method of claim 21, further comprising:

creating a billing record based on a number of Uniform Resource Locators pushed from the server to the client computer.

* * * * *